United States Patent
Stuber et al.

(10) Patent No.: US 7,269,224 B2
(45) Date of Patent: Sep. 11, 2007

(54) APPARATUS AND METHODS FOR PROVIDING EFFICIENT SPACE-TIME STRUCTURES FOR PREAMBLES, PILOTS AND DATA FOR MULTI-INPUT, MULTI-OUTPUT COMMUNICATIONS SYSTEMS

(75) Inventors: Gordon L. Stuber, Atlanta, GA (US); Apurva N. Mody, Atlanta, GA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 673 days.

(21) Appl. No.: 10/245,090

(22) Filed: Sep. 17, 2002

(65) Prior Publication Data

US 2003/0076777 A1    Apr. 24, 2003

Related U.S. Application Data (60) Provisional application No. 60/322,786, filed on Sep. 17, 2001, provisional application No. 60/327,145, filed on Oct. 4, 2001.

(51) Int. Cl.
*H04K 1/10* (2006.01)

(52) U.S. Cl. .................. 375/260; 375/267; 375/299; 370/208

(58) Field of Classification Search ............... 375/267, 375/299, 146, 244, 220, 224, 286, 320, 326, 375/330, 353, 363, 260, 295, 341, 148, 347; 370/204, 335, 208, 203, 210, 209

See application file for complete search history.

(56) References Cited

U.S. PATENT DOCUMENTS

| 5,732,113 | A | 3/1998 | Schmidl et al. ............ 375/355 |
| 6,088,408 | A | 7/2000 | Calderbank et al. ........ 375/347 |
| 6,115,427 | A | 9/2000 | Calderbank et al. ........ 375/267 |
| 6,125,149 | A | 9/2000 | Jafarkhani et al. .......... 375/262 |
| 6,185,258 | B1 | 2/2001 | Alamouti et al. ........... 375/260 |
| 6,188,736 | B1 | 2/2001 | Lo et al. ..................... 375/347 |
| 6,317,411 | B1 * | 11/2001 | Whinnett et al. ........... 370/204 |
| 6,542,556 | B1 * | 4/2003 | Kuchi et al. ................ 375/299 |
| 6,546,055 | B1 * | 4/2003 | Schmidl et al. ............. 375/244 |

(Continued)

OTHER PUBLICATIONS

Eric W. Weisstein. "Gram-Schmidt Orthonormalization." From MathWorld—A Wolfram Web Resource. http://mathworld.wolfram.com/Gram-SchmidtOrthonormalization.html; © 1999-2006.*

(Continued)

*Primary Examiner*—Temesghen Ghebretinsae
(74) *Attorney, Agent, or Firm*—Thomas, Kayden, Horstemeyer & Risley LLP; Daniel J. Long (57) ABSTRACT

Apparatus and methods for providing efficient space-time structures for preambles, pilots and data for multi-input, multi-output (MIMO) communications systems are provided. One such embodiment includes providing a computer program that includes logic configured to provide an initial structure. The computer program further includes logic configured to verify that the rows of the initial structure are linearly independent and logic configured to apply an orthonormalization procedure to the initial structure to obtain a space-time structure. Methods are also provided for providing efficient space-time structures for preambles, pilots and data for MIMO communications systems.

6 Claims, 7 Drawing Sheets

U.S. PATENT DOCUMENTS

| | | | | |
|---|---|---|---|---|
| 6,549,581 | B1 * | 4/2003 | Izumi | 375/260 |
| 6,693,982 | B1 * | 2/2004 | Naguib et al. | 375/341 |
| 6,865,237 | B1 * | 3/2005 | Boariu et al. | 375/295 |
| 2001/0031019 | A1 | 10/2001 | Jafarhani et al. | 375/267 |
| 2001/0050964 | A1 | 12/2001 | Foschini et al. | 375/267 |
| 2001/0053143 | A1 | 12/2001 | Li et al. | 370/344 |
| 2002/0003774 | A1 * | 1/2002 | Wang et al. | 370/208 |
| 2002/0041635 | A1 | 4/2002 | Ma et al. | 375/267 |
| 2002/0044524 | A1 * | 4/2002 | Laroia et al. | 370/203 |
| 2002/0181390 | A1 | 12/2002 | Mody et al. | 370/208 |
| 2002/0181509 | A1 | 12/2002 | Mody et al. | 370/480 |

OTHER PUBLICATIONS

A quasi-orthogonal space-time block code Jafarkhani, H.; Communications, IEEE Transactions on vol. 49, Issue 1, Jan. 2001 pp. 1-4.*

A comparison of initialization schemes for blind adaptive beamforming Biedka, T.E.; Acoustics, Speech, and Signal Processing, 1998. ICASSP '98. Proceedings of the 1998 IEEE International Conference on; vol. 3, May 12-15, 1998 pp. 1665-1668 vol. 3.*

Space-time coded modulation for high data rate wireless communications Naguib, A.F.; Tarokh, V.; Seshadri, N.; Calderbank, A.R.; Global Telecommunications Conference, 1997. GLOBECOM '97., IEEE vol. 1, Nov. 3-8, 1997 pp. 102-109 vol. 1.*

Vahid Tarokh, Hamid Jafarkhani, and A. Robert Calderbank, "Space-Time Block Coding for Wireless Communications: Performance Results," IEEE Journal on Selected Areas in Communications, vol. 17, No. 3, Mar. 1999, pp. 451-460.

Vahid Tarokh, Hamid Jafarkhani, and A.R. Calderbank, "Space-Time Block Codes from Orthogonal Designs," IEEE Transactions on Information Theory, vol. 45, No. 5, Jul. 1999, pp. 1456-1467.

A.N. Mody and G.L. Stuber, "Efficient Training and Synchronization Sequence Structures for MIMO OFDM," 6th International OFDM-Workshop, Hamburg, Germany, Sep. 2001.

A.N. Mody and G.L. Stuber, "Synchronization of MIMO OFDM Systems," Proceedings of GLOBECOM 2001, San Antonio, 2001, vol. 1, pp. 509-513.

A.N. Mody and G.L. Stuber, "Receiver Implementation for a MIMO OFDM System," Proceedings of GLOBECOM 2002, Taipei, Taiwan, Nov. 2002.

A.N. Mody and G.L. Stuber, "Parameter Estimation for OFDM with Transmit-Receive Diversity," Proceedings of VTC Rhodes, Greece, 2001.

Timothy M. Schmidl and Donald C. Cox, "Robust Frequency and Timing Sychronization for OFDM," IEEE Transactions on Communications, vol. 45, No. 12, Dec. 1997, pp. 1613-1621.

Siavash M. Alamouti, "A Simple Transmit Delivery Technique for Wireless Communications," IEEE Journal on Select Areas in Communications, vol. 16, No. 8, Oct. 1998, pp. 1451-1458.

Ye (Geoffrey) Li, Nambirajan Seshadri, and Sirikiat Ariyavisitakul, "Channel Estimation for OFDM Systems with Transmitter Diversity in Mobile Wireless Channels," IEEE Journal on Selected Areas in Communications, vol. 17, No. 3, Mar. 1999, pp. 461-471.

* cited by examiner

APPARATUS AND METHODS FOR PROVIDING EFFICIENT SPACE-TIME STRUCTURES FOR PREAMBLES, PILOTS AND DATA FOR MULTI-INPUT, MULTI-OUTPUT COMMUNICATIONS SYSTEMS

CROSS-REFERENCE TO RELATED APPLICATIONS

This application claims priority to co-pending U.S. provisional application entitled, "Efficient Training and Synchronization Sequence Structures for MIMO OFDM," having serial No. 60/322,786, filed Sep. 17, 2001, which is entirely incorporated herein by reference.

This application is related to co-pending U.S. provisional application entitled "Preamble Structures for SISO and MIMO OFDM Systems," having Ser. No. 60/327,145, filed on Oct. 4, 2001, which is entirely incorporated herein by reference.

TECHNICAL FIELD OF THE INVENTION

The present invention is generally related to communications systems and, more particularly, to Multi-Input, Multi-Output (MIMO) communications systems.

BACKGROUND OF THE INVENTION

Significant developments in communications have been made by the introduction of technologies that increase system operating efficiency (i.e., system "throughput"). One example of these technologies is the use of two or more transmit antennas and two or more receive antennas (i.e., multiple antennas) in a wireless communications system that employs multiple frequencies (i.e., multiple carriers). Such systems are typically referred to as Multi-Input, Multi-Output (MIMO) communications systems. In contrast, traditional wireless communications systems typically employ one transmit antenna and one receive antenna operating at a single signal-carrier frequency (SC), and such systems are referred to accordingly as Single-Input, Single-Output (SISO) systems.

In the operation of MIMO communications systems, signals are typically transmitted over a common path (i.e., a channel) by multiple antennas. The signals are typically pre-processed to avoid interference from other signals in the common channel. There are several techniques that may be used to pre-process the signals in this regard, and some of these techniques may be combined to further improve system throughput. One such technique, known as Space-Time Processing (STP), processes and combines "preambles" and "data symbols" into "space-time signal structures." Wireless communications systems typically transmit data or information (e.g., voice, video, audio, text, etc.) as formatted signals, known as data symbols (or information symbols), which are typically organized into groups, known as data frames (or information frames).

Training symbols (or preamble symbols) are another type of symbol, which are typically added as prefixes to data symbols (e.g., at the beginning of data frames), to enable training (i.e., synchronization) of the data symbols between the transmitters and receivers of a MIMO communications system. These training symbol prefixes can be referred to as preambles or preamble structures. The combination of the preambles and data symbols can be referred to as space-time signal structures. Space-time structures may also be constructed using STP for preambles and data symbols individually. Furthermore, pilot structures (or pilots) are space-time structures that are also constructed by STP and have the same structure as preambles, although they are periodically arranged within groups of data symbols for different purposes. Certain properties incorporated into space-time signal structures make it possible to recover the data symbols from them through post-processing by a receiver, for example. Moreover, the formation and processing of space-time signal structures in a wireless communications system may provide increased strength (i.e., gain) in the recovered signal, which typically enhances the performance of the communications system.

Another technique that may be used to pre-process signals in MIMO communications systems is called Frequency Division Multiplexing (FDM). FDM involves dividing the frequency spectrum of a wireless communications system into sub-channels and transmitting modulated data or information (i.e., formatted signals for voice, video, audio, text, etc.) over these sub-channels at multiple signal-carrier frequencies ("sub-carrier frequencies"). Orthogonal Frequency Division Multiplexing (OFDM) has emerged as a popular form of FDM in which the sub-carrier frequencies are spaced apart by precise frequency differences. The application of OFDM technologies in SISO communications systems (i.e., SISO OFDM systems) provides the capability, among others, to transmit and receive relatively large amounts of information. The application of OFDM in MIMO communications systems (i.e., MIMO OFDM systems) provides the added capability of increased capacity to transmit and receive information using, generally, the same amount of bandwidth (i.e., transmission line capacity) as used in SISO OFDM systems. MIMO OFDM communications systems also offer improved performance to overcome some of the difficulties experienced in other FDM communications systems, such as performance degradation due to multiple versions of a transmitted signal being received over various transmission paths (i.e., multi-path channel interference).

In wireless communications systems (e.g., SISO or MIMO), synchronization of data symbols is typically required in both time and frequency. Estimation of noise variance and channel parameters is also typically required. Thus, efficient preamble structures and pilot structures for use in wireless communications systems should provide both synchronization and parameter estimation. Furthermore, efficient preamble structures and pilot structures should possess a low peak-to-average power ratio (PAPR) (i.e., at or approaching unity) to facilitate efficient system operation. In their application to MIMO communications systems, however, existing preamble structures and pilot structures have shortcomings in their capability to provide the foregoing functions of time and frequency synchronization, estimation of noise variance and channel parameters, and low PAPR. For example, the IEEE Standard 802.11a preamble structure includes a short sequence, which provides time synchronization and coarse frequency offset estimation, followed by a long sequence, which provides fine frequency and channel estimation. Although this preamble has direct application to SISO communications systems, it is not directly applicable to MIMO communications systems to provide the above mentioned functions, without the need for significant modifications.

Existing techniques for space-time processing of preamble symbols, pilot symbols, and data symbols into space-time structures also have shortcomings in their applications to MIMO communications systems. For example, existing space-time structures (i.e., preamble, pilot, or data) are typically limited to applications in MIMO communications systems that employ two, four, or eight transmit antennas. However, MIMO communications systems may be required that employ other numbers of transmit antennas to satisfy various applications. As another example, existing space-time structures do not support the "full diversity" performance of MIMO communications systems. That is, existing space-time structures do not support the optimal signal transmission performance that MIMO communications systems can provide. For example, a MIMO communications system that employs four transmit antennas can provide a full diversity signal transmission performance of four space-time structures over four time periods. However, typical existing space-time structures are limited to support a signal transmission performance of no better than three space-time structures over four time periods in a four-antenna MIMO system.

Therefore, there is a need for apparatus and methods for providing efficient preamble structures and pilot structures that provide time and frequency synchronization, estimation of noise variance and channel parameters, and low PAPR in their application to MIMO communications systems. Moreover, there is a need for an apparatus and methods for providing space-time structures (i.e., preamble, pilot, or data) that can be applied to MIMO communications systems with any number of transmit and receive antennas and that facilitate full diversity performance of MIMO communications systems.

SUMMARY OF THE INVENTION

The present invention provides an apparatus and methods for providing efficient space-time structures for preambles, pilots and data for multi-input, multi-output (MIMO) communications systems.

Briefly described, one embodiment of the present invention, among others, includes providing a computer program that includes logic configured to provide an initial structure. The computer program further includes logic configured to verify that the rows of the initial structure are linearly independent and logic configured to apply an orthonormalization procedure to the initial structure to obtain a space-time structure.

The present invention can also be viewed as providing methods for providing efficient space-time structures for preambles, pilots and data for MIMO communications systems. In this regard, one embodiment of such a method, among others, can be broadly summarized by the following: providing an initial structure, verifying that the rows of the initial structure are linearly independent, and applying an orthonormalization procedure to the initial structure to obtain a space-time structure.

Another embodiment of a method of the present invention can be broadly described by the following: selecting a data structure, verifying that the data structure is a unitary transmission matrix, and applying the data structure as a space-time preamble structure.

Other apparatus, methods, features and advantages of the present invention will be or become apparent to one with skill in the art upon examination of the following drawings and detailed description. It is intended that all such additional apparatus, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. Moreover, in the drawings, like reference numerals designate corresponding parts throughout the several views.

DETAILED DESCRIPTION

The invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
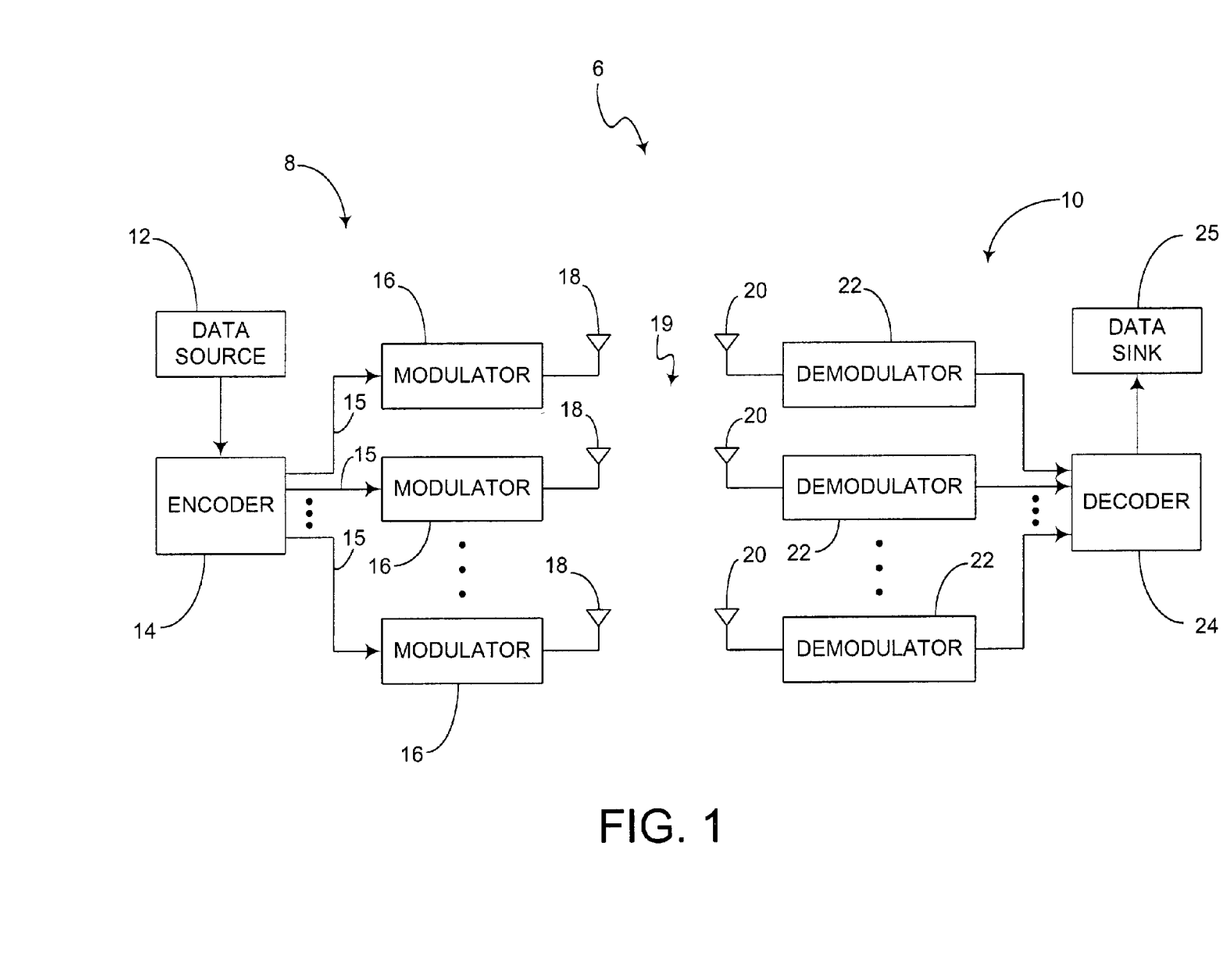
FIG. 1 is a block diagram of an exemplary Multi-Input, Multi-Output (MIMO) communications system.

FIG. 1 shows a block diagram of an exemplary Multi-Input, Multi-Output (MIMO) communications system 6. The exemplary MIMO communications system 6 and its sub-components will be described hereinafter to facilitate the description of the present invention. In that regard, the exemplary MIMO communications system 6 may be implemented as a wireless system for the transmission and reception of data across a wireless channel 19, as depicted in FIG. 1. For example, the MIMO communications system 6 may be implemented as part of a wireless Local Area Network (LAN) or Metropolitan Area Network (MAN) system, a cellular telephone system, or another type of radio or microwave frequency system incorporating one-way or two-way communications over a range of distances.

The MIMO communications system 6 may transmit and receive signals at various frequencies. For example, the MIMO communications system 6 may transmit and receive signals in a frequency range from 2 to 11 GHz, such as in the unlicensed 5.8 GHz band, using a bandwidth of about 3 to 6 MHz. Further, the MIMO communications system 6 may employ various signal modulation and demodulation techniques, such as Single-Carrier Frequency Domain Equalization (SCFDE) or Orthogonal Frequency Division Multiplexing (OFDM), for example. However, throughout this description, references may be made with respect to a MIMO OFDM communications systems merely to facilitate the description of the invention.

The MIMO communications system 6 may also be implemented as part of a communications system (not shown) that includes an array of sub-channel communications links, which convey one or more signals transmitted by one or more transmitting elements to one or more receiving elements. The sub-channel communications links may include wires (e.g., in a wiring harness) or other forms of tangible transmission medium that span between a data source and a receiver within the communications system.

The MIMO communications system 6 includes a transmitter 8 and a receiver 10. The transmitter 8 typically transmits signals across a channel 19 to the receiver 10. As depicted in FIG. 1, the transmitter 8 typically includes several components. In this regard, the transmitter 8 includes an encoder 14. The encoder 14 typically encodes data and/or other types of signals received, for example, from a data source 12. Such signals may alternatively be referred to collectively hereinafter as "data," "signals," or "data signals." The data source 12 may be a device, system, etc. that outputs such signals. The encoder 14 may also perform functions such as employing a channel code on data for transmission and forming sequence structures by space-time processing (STP) techniques. Further, the encoder 14 may separate the received signals onto one or more signal paths 15, included in the transmitter 8, which will be referred to hereinafter as transmit diversity branches (TDBs) 15. Each TDB 15 may correlate to a different sub-channel within the MIMO communications system 6. The encoder 14 typically facilitates the transmission of signals across the channel 19 by bundling the signals into groups, which are typically referred to as a "frame." Details of a frame, with respect to the present invention, will be discussed further below.

The transmitter 8 also includes one or more modulators 16 that are configured to modulate signals for transmission over the channel 19. In this regard, the modulators 16 may employ various modulation techniques, such as SCFDE or OFDM. The modulators 16 are typically connected to the encoder 14 by the TDBs 15. The transmitter also includes one or more transmit antennas 18 connected respectively to the one or more modulators 16. Thus, each TDB 15 directs signals from the encoder 14 to one or more modulators 16, and the modulators 16 modulate the signals for transmission by a respective transmit antenna 18.

As discussed above, the exemplary MIMO communications system 6, shown in FIG. 1, also includes a receiver 10. The receiver 10 also typically includes several components. The receiver includes one or more receive antennas 20 that are connected to one or more demodulators 22, respectively. The receive antennas 20 typically receive modulated signals that are transmitted across the channel 19 from the transmit antennas 18. The received signals are typically directed to the demodulators 22 from the respective receive antennas 20. The demodulators 22 demodulate signals that are received by the respective receive antennas 20.

The receiver 10 also includes a decoder 24, which is connected to the demodulators 22. The decoder 24 typically combines and decodes demodulated signals from the demodulators 22. In this regard, the decoder 24 typically recovers the original signals that were input to the transmitter 8 from the data source 12 and transmitted across the channel 19. As depicted in FIG. 1, the original signals recovered by the decoder 24 may be transmitted to a connected data sink 25, which may include one or more devices configured to utilize or process the original signals.

As discussed above, the transmitter 8 of the MIMO communications system 6 includes one or more modulators 16 that are connected to one or more transmit antennas 18, respectively. Further, the receiver 10 of the communications system 6 includes one or more demodulators 22 that are connected to one or more receive antennas 20, respectively. In this regard, the number of modulators 16 and respective transmit antennas 18 that are implemented in the transmitter 8 may be represented by a first variable, "Q." Similarly, the number of demodulators 22 and respective receive antennas 20 that are implemented in the receiver 10 may be represented by a second variable, "L." In the exemplary MIMO communications system 6, the number (Q) of modulators 16 and respective transmit antennas 18 may be equivalent or non-equivalent to the number (L) of demodulators 22 and respective receive antennas 20. In this regard, the communications system 6 may be said to have "Q×L" transmit-receive diversity.

Figure 2:
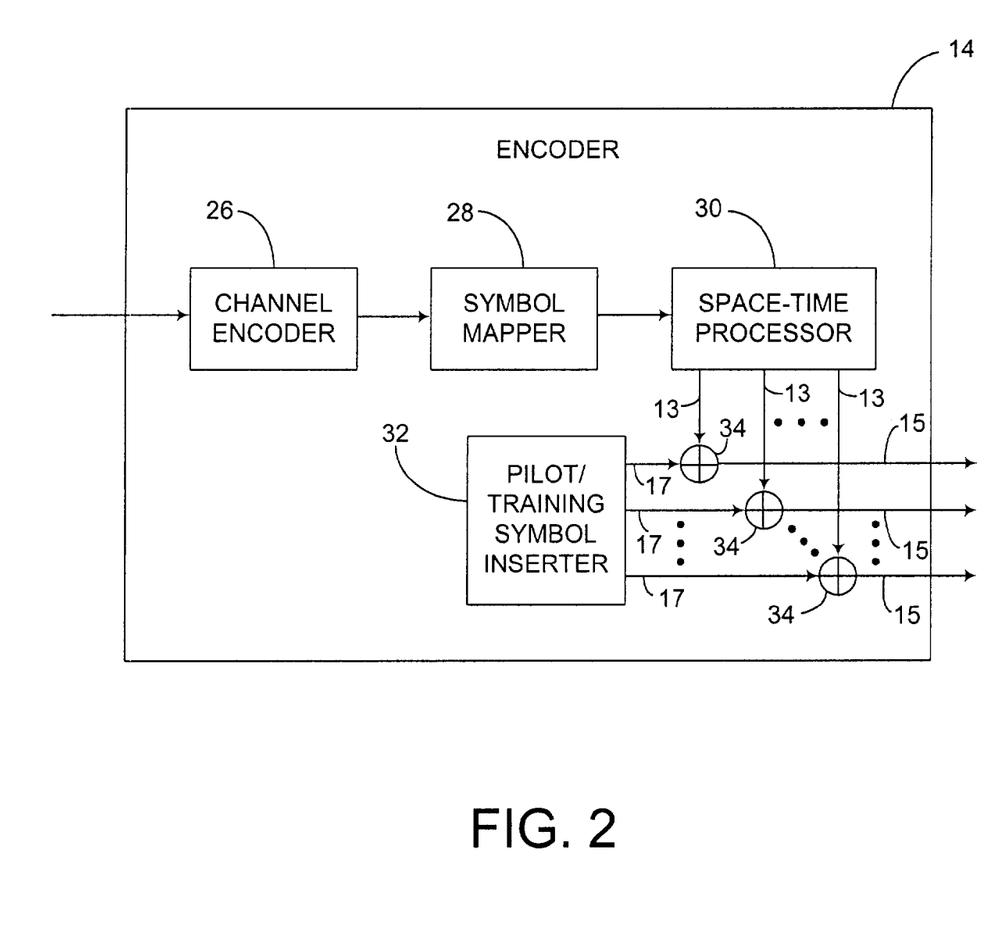
FIG. 2 is a block diagram of an exemplary encoder with respect to the communications system depicted in FIG. 1.

FIG. 2 is a block diagram of an exemplary encoder 14 with respect to the communications system 6 depicted in FIG. 1. The elements of the encoder 14 shown in FIG. 2 will be described below with respect to several elements that were described above for FIG. 1. The exemplary encoder 14 includes a channel encoder 26. The channel encoder 26 typically converts data and/or other types of signals to channel encoded versions of the signals, which may also be referred to collectively as "channel encoded data" or "channel encoded signals." These signals may be received by the channel encoder 26 from a data source 12, for example. The channel encoder 26 is typically configured to encode signals using an encoding scheme that can be recognized by the decoder 24 of the receiver 10 that is intended to receive the channel encoded signals. In the process of encoding signals, the channel encoder 26 also typically adds parity to the signals so that the receiving decoder 24 can detect errors in the received channel encoded signals, which may occur, for example, due to environmental conditions of the channel 19 or inadvertent noise injection by the transmitter 8 or receiver 10, for example.

The exemplary encoder 14 depicted in FIG. 2 also includes a symbol mapper 28, which receives channel encoded data from the channel encoder 26. The symbol mapper 28 is typically configured to map channel encoded data into data symbols. The symbol mapper 28 typically maps channel encoded data into data symbols by grouping a predetermined number of bits of the data so that each group of bits constitutes a specific symbol that is selected from a pre-determined symbol alphabet. In this regard, a symbol alphabet typically includes a finite set of values. For example, a symbol alphabet of a binary phase shift keying (BPSK) system typically consists of the values +1 and −1, and a symbol alphabet for a quadrature phase shift keying (QPSK) system typically consists of the values 1+j, −1+j, 1−j, and −1−j. The symbol mapper 28 is also typically configured to structure a stream of data symbols into a data section, which will be discussed further below.

The exemplary encoder 14 also includes a space-time processor 30. The space-time processor 30 is typically configured to encode data symbol streams (i.e., data sections), received from the symbol mapper 28, through space-time processing to form space-time structures with properties that enhance the performance of the communication systems 6. The encoded data sections are output from the space-time processor 30 over Q lines 13, where Q represents the number of modulators 16 and respective transmit antennas 18 of the transmitter 8, as discussed above.

As illustrated in FIG. 2, the Q output lines from the space-time processor 30 input respectively to Q adders 34. The encoder 14 also includes a pilot/training symbol inserter 32, which also has Q output lines 17 that input respectively to the Q adders 34. As depicted in FIG. 2, the Q adders 34 output to Q transmit diversity branches (TDBs) 15, which input respectively to Q modulators 16. The pilot/training symbol inserter 32 typically provides pilot symbols and training symbols that are inserted into (or combined with) data sections by the adders 34, which then output the modified data sections as space-time structures over the TDBs 15.

The term pilot symbols, as used in this description, refers to symbols provided by the pilot/training symbol inserter 32, which are inserted periodically into data sections. Typically, pilot symbols may be inserted at any point in a data section. The term training symbols, as also used in this description, refers to one or more continuous sections of training symbols provided by the pilot/training symbol inserter 32, which are inserted into data sections. Training symbols are preferably inserted into data sections at the beginning of the section and transmitted once per frame. However, training symbols may also be inserted at other parts of data sections, such as the middle or end of the sections. Preambles (or preamble structures) are symbol structures formed of training symbols. Pilot structures (or pilots) are symbol structures formed of pilot symbols.

Pilot symbols are typically transmitted with data sections to perform minor adjustments to the calibration (i.e., synchronization and channel parameter estimation) of the receiver 10 to the transmitter 8 to accommodate, for example, the time varying nature of the channel 19. Training symbols, however, are typically used for periodic calibration of the receiver 10 to the transmitter 8. The training symbols that are transmitted for each sub-channel may be unique. Moreover, different sets of training symbols and/or pilot symbols may be provided by the pilot/training symbol inserter 32, depending on the operating criteria of the communications system 6, which may be determined, for example, by the user. However, although pilot symbols and training symbols have different purposes, the structure of preambles and pilot structures are the same. Therefore, all descriptions made hereinafter, in accordance with the present invention, with respect to preambles or preambles structures also apply to pilots or pilot structures unless otherwise specified).

Figure 3:
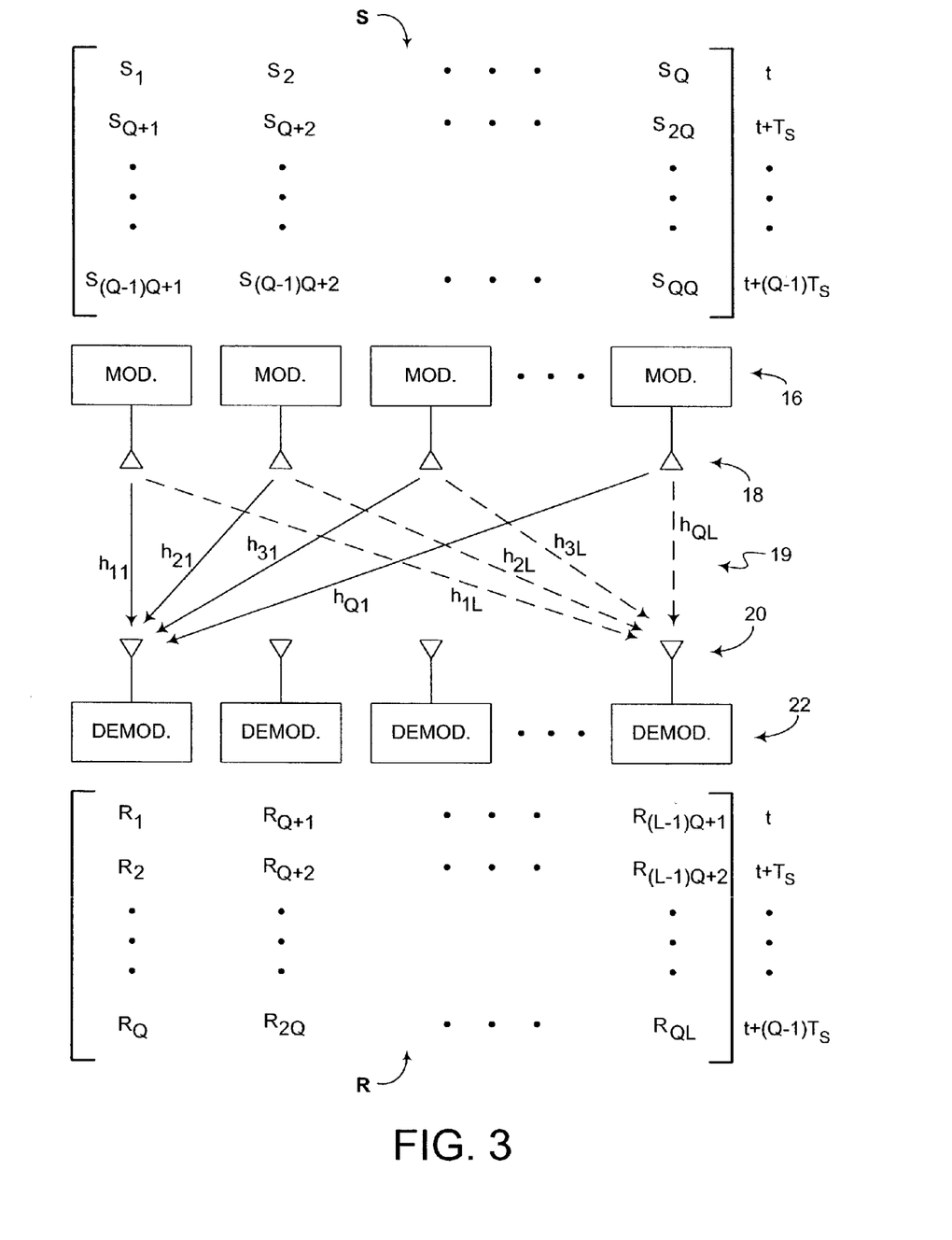
FIG. 3 is a diagram illustrating exemplary signal transmissions and associated signal sample matrices with respect to the communications system depicted in FIG. 1.

FIG. 3 is a diagram that illustrates exemplary signal transmissions and associated signal sample matrices with respect to the modulator/demodulator configuration of the communications system 6 depicted in FIG. 1. As shown in FIG. 3, the configuration includes one or more modulators 16 and one or more demodulators 22. As discussed above with respect to FIG. 1, the modulators 16 and the demodulators 22 may be configured to modulate and demodulate signals, respectively, by various techniques, such as SCFDE or OFDM.

Each modulator 16 is connected to one or more respective transmit antennas 18, and each demodulator 22 is connected to one or more respective receive antennas 20. As discussed above with respect to FIG. 1, the transmit antennas 18 are typically configured to transmit modulated signals across a channel 19, and the receive antennas 20 are typically configured to receive modulated signals via the channel 19. In this regard, exemplary signal transmissions are depicted in FIG. 3, which will be discussed further below.

Similar to the above discussion with respect to the MIMO communications system 6 of FIG. 1, in the modulator/demodulator configuration of FIG. 3, the number of modulators 16 and respective transmit antennas 18 that are implemented may be represented by the variable, "Q." Accordingly, the number of demodulators 22 and respective receive antennas 20 in the arrangement of FIG. 3 may be represented by the variable, "L." Thus the modulator/demodulator arrangement depicted in FIG. 3 may also be described as having "Q×L" transmit-receive diversity. Moreover, the variables, Q and L, may be equivalent or non-equivalent in various configurations of the modulators 16 and demodulators 22.

Exemplary signal transmissions from the Q transmit antennas 18 to the L receive antennas 20, across the channel 19, are also depicted in FIG. 3. For example, a first of the L receive antennas 20 may receive each of the Q transmitted signals from the Q transmit antennas 18. These Q transmitted signals are typically transmitted over channel impulse responses $h_{11}$, $h_{21}$, $h_{31}$, . . . , $h_{Q1}$, that are transmitted from the $1^{st}$ to the $Q^{th}$ transmit antennas 18, respectively, as depicted in FIG. 3. In this regard, the term $h_{ij}$ (where i=1, 2, 3, . . . , Q and j=1, 2, 3, . . . , L) is used to refer to the channel impulse response, in the time domain, that is transmitted from the $i^{th}$ transmit antenna 18 to the $j^{th}$ receive antenna 20. Thus, as a further example, the $L^{th}$ receive antenna 20 may receive each of the Q transmitted signals, over the channel impulse responses $h_{1L}$, $h_{2L}$, $h_{3L}$, . . . , $h_{QL}$, from the $1^{st}$ to the $Q^{th}$ transmit antennas 18, respectively, as depicted in FIG. 3. Although, for simplicity, exemplary signal transmissions are depicted in FIG. 3 from the Q transmit antennas 18 to only the $1^{st}$ and the $L^{th}$ receive antennas 20, in a typical MIMO communications system, signals transmissions may occur from any of the Q transmit antennas 18 to any of the L receive antennas 20.

A transmit sample matrix S is illustrated in FIG. 3. The matrix S is associated with the signals that are modulated by the Q modulators 16 and transmitted over the channel 19 from the Q transmit antennas 18. In this regard, the sample matrix S may be associated with signals that are transmitted by a MIMO communications system. Thus, the elements of the transmit sample matrix S may represent Q space-time symbols (i.e., preamble or data), which are simultaneously transmitted from the Q transmit antennas 18 during Q or more symbol periods ("$T_S$"). For example, the elements of the first row of the transmit sample matrix S may represent the symbols $S_1$, $S_2$, . . . , $S_Q$, which are transmitted from the $1^{st}$ through the $Q^{th}$ transmit antennas 18, respectively, at a first time ("t"). Similarly, the elements of the second row of the transmit sample matrix S may represent the symbols $S_{Q+1}$, $S_{Q+2}$, . . . , $S_{2Q}$, which are transmitted from the $1^{st}$ through the $Q^{th}$ transmit antennas 18, respectively, at a second time ("t+$T_S$"). The elements of the last row of the transmit sample matrix S may represent the final set of symbols, $S_{(Q-1)Q+1}$, $S_{(Q-1)Q+2}$, . . . , $S_{QQ}$, which are transmitted from the $1^{st}$ through the $Q^{th}$ transmit antennas 18, respectively, at a final time ("t+(Q-1)$T_S$").

Also illustrated in FIG. 3 is a receive sample matrix R, which is associated with the signals that are received over the channel 19 by the L receive antennas 20 and demodulated by the L demodulators 22. Similar to the elements of the transmit sample matrix S, described above, the elements of the receive sample matrix R may represent L space-time symbols, which are simultaneously received by the L receive antennas 20 during Q or more symbol periods ("$T_S$"). For example, the elements of the first row of the receive sample matrix R may represent the symbols $R_1$, $R_{Q+1}$, . . . , $R_{(L-1)Q+1}$, which are demodulated by the $1^{st}$ through the $L^{th}$ demodulators 22, respectively, at a first time ("t"). Similarly, the elements of the second row of the receive sample matrix R may represent the symbols $R_2, R_{Q+2} \ldots, R_{(L-1)Q+2}$, which are demodulated by the $1^{st}$ through the $L^{th}$ demodulators 22, respectively, at a second time ("$t+T_S$"). The elements of the last row of the receive sample matrix R may represent the final set of symbols, $R_Q, R_{2Q}, \ldots, R_{QL}$, which are demodulated by the $1^{st}$ through the $L^{th}$ demodulators 22, respectively, at a final time ("$t+(Q-1)T_S$"). It is noted that although references are made to the same time instances (e.g., t, $t+T_S$, etc.) in the foregoing descriptions, as well as in FIG. 3, with respect to the transmit sample matrix S and the receive sample matrix R, there is typically a time delay between the transmission and reception of the signals represented by these matrices.

In addition to the transmit sample matrix S and the receive sample matrix R, there are at least two other matrices that are relevant to represent the transmission and reception of signals in a MIMO communications system, such as the system depicted in FIGS. 1 and 3. The channel matrix η typically includes elements that represent channel coefficients, which are determined based on characteristics of the channel 19. The channel matrix η typically has a dimension of Q×L. The noise matrix W typically includes elements that represent additive white Gaussian noise, which typically causes distortion and corruption of received signals that are represented, for example, by the receive sample matrix R. The noise matrix W typically has a dimension of Q×L.

The relationship between the receive sample matrix R, the transmit sample matrix S, the channel matrix η, and the noise matrix W can be expressed by the following equation:

$$R_{k,T \times L} = S_{k,T \times Q} \eta_{k,Q \times L} + W_{k,T \times L} \qquad \text{EQ. 1}$$

With respect to EQ. 1, k represents the sub-carrier or sub-channel of received demodulated signals and T represents a dimension variable that is typically equivalent to Q, although it may have other values. As discussed above, Q and L represent, respectively, the number of modulators 16 and respective transmit antennas 18 and the number of demodulators 22 and respective receive antennas 20 with respect to a typical MIMO communications system 6.

Figure 4:
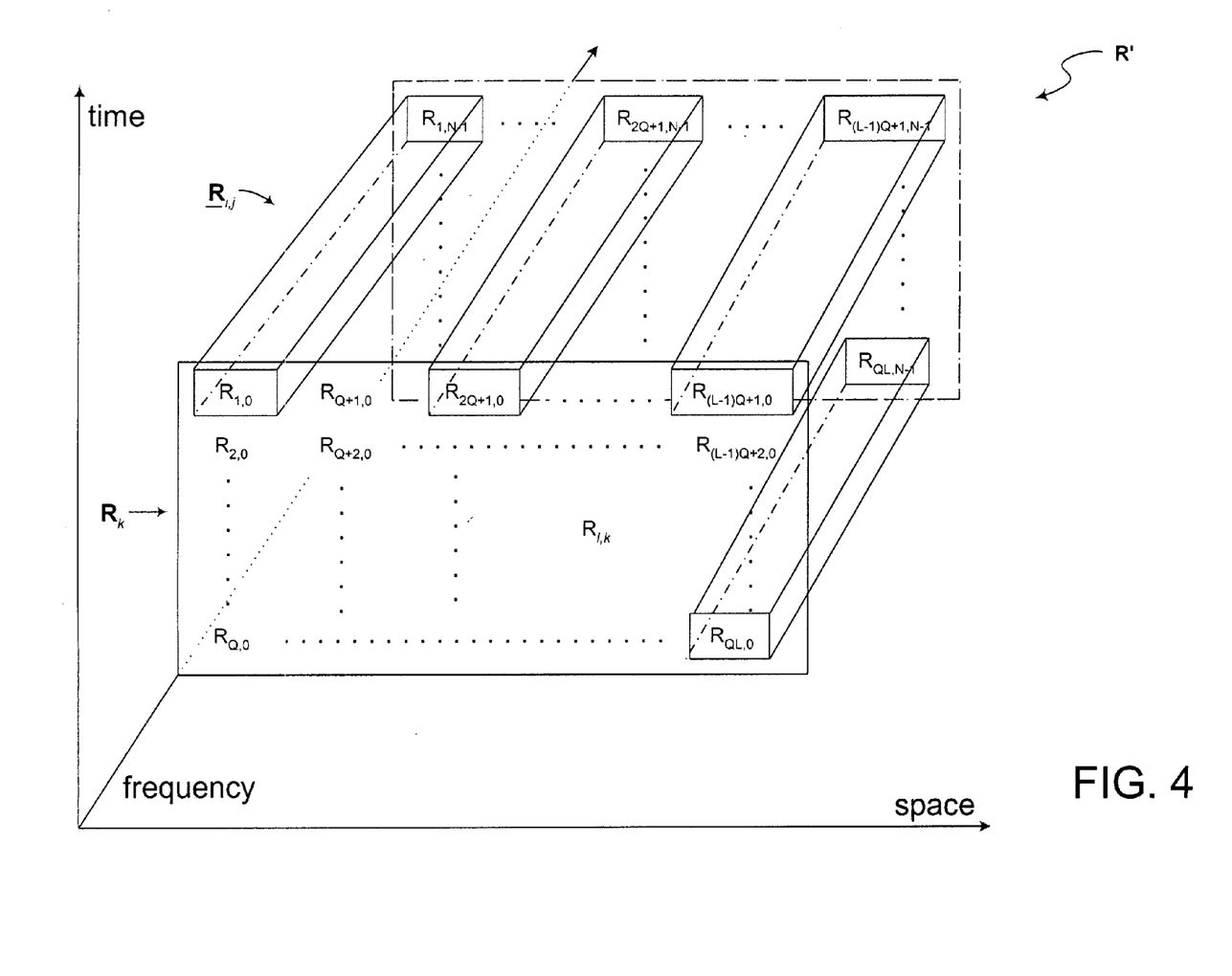
FIG. 4 is a graphical illustration of a version of the receive sample matrix shown in FIG. 3 that is applicable to the MIMO communications system of FIG. 1 when employing Orthogonal Frequency Division Multiplexing (OFDM).

FIG. 4 is a graphic illustration of a version of the receive sample matrix R' shown in FIG. 3 that is applicable to the MIMO communications system of FIG. 1, when employing Orthogonal Frequency Division Multiplexing (OFDM). As shown, the x axis represents space, the y axis represents time, and the z axis represents frequency. Each receive sample matrix $R_k$ that is depicted in the space-time dimensions is similar to the receive sample matrix R discussed above with respect to FIG. 3. However, each element of the receive sample matrix R' illustrated in FIG. 4 also has N frequency components that are each represented by an index, "k". As k varies from 0 to N-1 for the elements of each receive sample matrix $R_k$ in FIG. 4, the frequency component of the received symbol varies accordingly. Thus, the three-dimensional receive sample matrix R' can be viewed as including N receive sample matrices $R_k$ of dimensions Q×L or Q*L vectors $R_{1,j}$ of length N. For example, with respect to the symbol received by the $1^{st}$ antenna and demodulated by the $1^{st}$ demodulator, there is a vector of elements $R_{1,0}, R_{1,1}, \ldots, R_{1,N-1}$, as depicted in FIG. 4.

Figure 5:
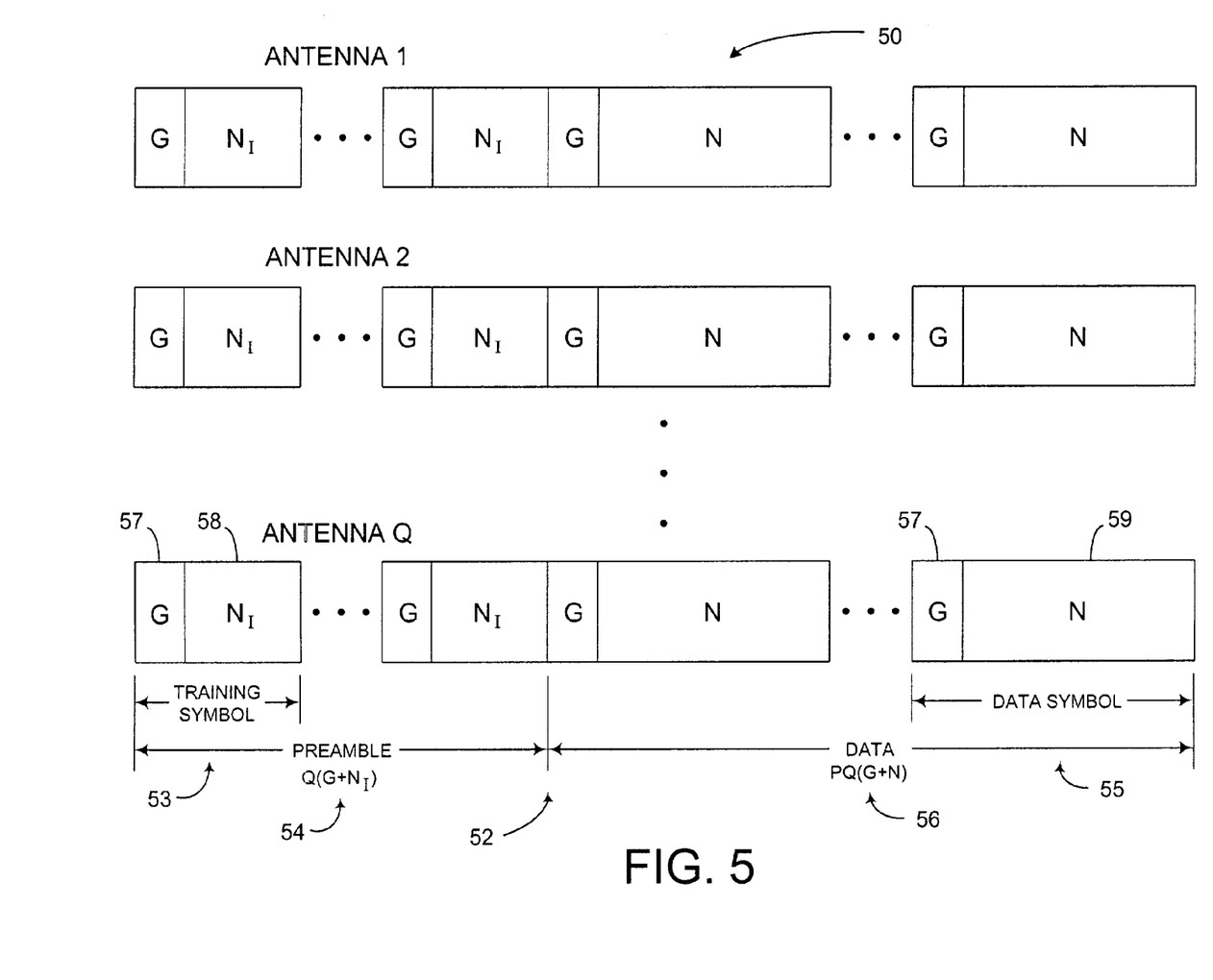
FIG. 5 illustrates an exemplary frame that may be implemented in the MIMO communications system depicted in FIG. 1.

FIG. 5 illustrates an exemplary frame 50 that may be implemented in a MIMO communications system that has Q transmit antennas, such as the communications system depicted in FIGS. 1 and 3. As depicted in FIG. 5, the frame 50 typically includes Q signal structures 52, which correspond respectively to the Q antennas. Each signal structure 52 typically includes a preamble 54 and a data section 56. As discussed above for FIG. 2, the preamble 54 is typically inserted into the data section 56 by the pilot/training symbol inserter 32. The preamble 54 typically includes one or more training blocks 58 of length $N_I$ and cyclic prefixes 57 of length G, as depicted in FIG. 5. The combination of a cyclic prefix 57 and a training block 58 forms a training symbol 53 that has a length of $G+N_I$ samples in the time domain. Thus, as depicted, the preamble 54 typically includes Q training symbols 53 that have an overall length of $Q*(G+N_I)$ samples in the time domain. A cyclic prefix 57 may also be referred to as a guard interval, since the cyclic prefix 57 typically functions to guard the signal structures 52 from inter-symbol interference (ISI) during transmission as a frame 50 across the channel 19. The time length of the cyclic prefix 57 is typically greater than the maximum length of the channel impulse response $h_{ij}$, which was discussed above for FIG. 3.

As also depicted in FIG. 5, the data section 56 typically includes one or more data blocks 59 of length N and cyclic prefixes 57 of length G. The combination of a cyclic prefix 57 and a data block 59 forms a data symbol 55 that has a length of G+N samples in the time domain. Therefore, the data section 56 of the signal structure 52 typically includes Q or more data symbols 55 that have an overall length of $P*Q*(G+N)$ samples in the time domain, as depicted in FIG. 5, where P is some positive integer. Although not depicted in FIG. 5, for simplicity, pilot symbols may also be intermittently inserted into the data symbols 55 by the pilot/training symbol inserter 32, as discussed above.

The length $N_I$ of a training block 58 may be shorter than the length N of a data block 59 in a signal structure 52. Typically, the length $N_I$ of a training block 58 in the preamble 54 is established as a fraction of the length N of a data block 59 in the data section 56 to provide the relationship of $N_I$ being equivalent to N/I, where I is some positive integer. For example, $N_I$ may be equivalent to N/4 (i.e., I=4). If the length $N_I$ of a training block 58 is not established, the length $N_I$ may be assumed to be equivalent to N (i.e., I=1). Typically, the length of a training symbol 53 (i.e., $G+N_I$) is equivalent to the length of a data symbol 55 (i.e., G+N). However, it is feasible for the training symbol 53 to be shorter than the data symbol 55 in the context of the signal structure 52.

A primary purpose of the preamble 54 is to enable the receiver 10 (FIG. 1) to identify the arrival of the signal structure 52. Thus, the preamble 54 may facilitate time synchronization, frequency synchronization, channel parameter estimation, and noise variance estimation. Efficient space-time structures for the preamble 54 ("space-time preamble structures"), in accordance with the present invention, provide time synchronization, frequency synchronization, channel parameter estimation, and noise variance estimation through synchronization signals that have low peak-to-average power ratios (PAPR) (e.g., at or approaching unity).

A space-time preamble structure, which may also be referred to as a space-time training structure, may be represented by a signal transmission matrix $S_k$. In accordance with an embodiment of the present invention, the signal transmission matrix $S_k$ of an efficient space-time preamble structure should be a unitary transmission matrix in the frequency domain and have a low PAPR in the time domain. In this regard, efficient space-time preamble structures provide enhanced performance in MIMO communications systems.

A unitary transmission matrix contains rows and columns that are orthogonal to each other, and the energy of the signals represented by each row or column is unity. In mathematical terms, a unitary transmission matrix has the properties represented by the following equations:

$$\sum_{j=1}^{Q} S_{i,j} S_{i',j}^* = \begin{cases} 1 & i = i' \\ 0 & i \neq i' \end{cases} \quad \text{EQ. 2A}$$

$$\sum_{i=1}^{Q} S_{i,j} S_{i,j'}^* = \begin{cases} 1 & j = j' \\ 0 & j \neq j' \end{cases} \quad \text{EQ. 2B}$$

where $S_{i,j}$ represents the constituent symbols of the unitary transmission matrix.

Providing a space-time preamble structure that is a unitary signal transmission matrix $S_k$ reduces or eliminates noise enhancement during channel estimation of the received signals. Moreover, providing a space-time preamble structure that possesses a low PAPR reduces or eliminates signal non-linearities and spurious, out-of-band signal transmissions. As will be discussed below, data structures formed by space-time processing (i.e., space-time data structures) to be a unitary transmission matrix also provide enhanced performance in MIMO communications systems.

The following descriptions present several examples of data structures that, in accordance with the present invention, can be applied and/or modified to provide space-time preamble structures that are unitary transmission matrices. As a first example, a diagonal data structure can be applied and/or modified to provide a space-time preamble structure in accordance with the present invention. In this regard, the resulting diagonal space-time preamble structure is a unitary transmission matrix. The following diagonal structure $S_{D1}$ is an example of this unitary transmission matrix that can be applied as a space-time preamble in a MIMO communications system with Q antennas:

$$S_D = \begin{bmatrix} S_1 & 0 & \cdots & 0 \\ 0 & S_2 & \cdots & \vdots \\ \vdots & 0 & \ddots & 0 \\ 0 & \cdots & 0 & S_Q \end{bmatrix} \quad \text{EQ. 3}$$

The foregoing diagonal space-time preamble structure $S_{D1}$ can be simplified so that the same training symbol (e.g., $S_1$) can be transmitted from each antenna, instead of Q different training symbols (i.e., $S_1$, $S_2$, etc.), as shown by the following simplified diagonal structure $S_{DS}$ that can be applied, in accordance with the present invention, as a space-time preamble structure in a MIMO communications system with Q antennas:

$$S_{DS} = \begin{bmatrix} S_1 & 0 & \cdots & 0 \\ 0 & S_1 & \cdots & \vdots \\ \vdots & 0 & \ddots & 0 \\ 0 & \cdots & 0 & S_1 \end{bmatrix} \quad \text{EQ. 4}$$

When the foregoing diagonal structures $S_D$, $S_{DS}$ are applied as space-time preamble structures in a MIMO communications system, the training symbols are transmitted sequentially in time from each corresponding transmit antenna, and the parameters of the received symbols are estimated by the receivers connected to each receive antenna. Due to their unitary characteristic, the diagonal structures $S_D$, $S_{DS}$, provide simplified signal acquisition (i.e., synchronization) and parameter estimation when applied as a space-time preamble structure in a MIMO communications system. These diagonal structures $S_D$, $S_{DS}$, are preferably applied as space-time preamble structures, in MIMO communications systems that use two transmit antennas. As the number (Q) of transmit antennas in the MIMO system is increased, the power output from each transmit antenna typically has to be reduced by a factor of Q due to the nature of MIMO systems. As a result, the efficiency of the diagonal space-time preamble structures $S_D$, $S_{DS}$ may decrease in MIMO systems with more than two transmit antennas, since the diagonal structures $S_D$, $S_{DS}$ only include symbols on the main diagonal (i.e., spanning from the top-left to the bottom).

A data structure that was introduced by S. Alamouti is another example of a data structure that can be applied and/or modified, in accordance with the present invention, to provide a space-time preamble structure $S_A$. This data structure is a unitary transmission matrix, and it can be applied as a space-time preamble structure $S_A$, in MIMO communications systems that employ two transmit antennas. The space-time preamble structure $S_A$ has the following form:

$$S_A = \begin{bmatrix} S_1 & S_2 \\ -S_2^* & S_1^* \end{bmatrix} \quad \text{EQ. 5}$$

In the above space-time preamble structure $S_A$, the "*" symbol indicates a complex conjugate operation. The foregoing space-time preamble structure $S_A$ can also be simplified, in accordance with the present invention, so that the same training symbol is transmitted from each of the two antennas of the MIMO system, as shown by the following simplified space-time preamble structure $S_{AS}$:

$$S_{AS} = \begin{bmatrix} S_1 & S_1 \\ -S_1^* & S_1^* \end{bmatrix} \quad \text{EQ. 6}$$

Several orthogonal structures that were introduced by V. Tarokh, et al. are examples of data structures that can be applied and/or modified, in accordance with the present invention, to provide space-time preamble structures that are unitary transmission matrices. These data structures can be applied as space-time preamble structures, in accordance with the present invention, in MIMO communications systems that employ four or eight transmit antennas. For a four-antenna MIMO system, the following space-time preamble structure $S_{T4}$ can be applied, in accordance with present invention, when the constituent symbols have real number values:

$$S_{T4} = \begin{bmatrix} S_1 & S_2 & S_3 & S_4 \\ -S_2 & S_1 & -S_4 & S_3 \\ -S_3 & S_4 & S_1 & -S_2 \\ -S_4 & -S_3 & S_2 & S_1 \end{bmatrix} \quad \text{EQ. 7}$$

The foregoing space-time preamble structure $S_{T4}$ can be simplified, in accordance with the present invention, so that the same training symbol is transmitted from each of the four antennas of the MIMO system, as shown by the following simplified space-time preamble structure $S_{T4S}$. The symbols of this structure $S_{T4S}$ may have complex values (e.g., W+jX):

$$S_{T4S} = \begin{bmatrix} S_1 & S_1 & S_1 & S_1 \\ -S_1 & S_1 & -S_1 & S_1 \\ -S_1 & S_1 & S_1 & -S_1 \\ -S_1 & -S_1 & S_1 & S_1 \end{bmatrix} \quad \text{EQ. 8}$$

The foregoing simplified structures $S_{AS}$, $S_{T4S}$ (i.e., EQ. 6 and EQ. 8) typically form unitary transmission matrices when applied as space-time preamble structures, without further modification. Furthermore, the PAPR of the simplified space-time preamble structures $S_{AS}$, $S_{T4S}$ are typically unity when the symbols consist of chirp-type sequences, such as:

$$s_n = \exp\left(\frac{j\pi n^2}{N}\right), n = 0, 1, \ldots, N-1). \quad \text{EQ. 9}$$

Therefore, these simplified structures $S_{AS}$, $S_{T4S}$ are typically efficient (i.e., they provide time and frequency synchronization, estimation of noise variance and channel parameters, and low PAPR) when applied, in accordance with the present invention, as space-time preamble structures.

The foregoing structures $S_A$, $S_{T4}$ (i.e., EQ. 5 and EQ. 7) are also typically efficient when applied as space-time preamble structures, in accordance with the present invention. The structure $S_{T4}$ is typically not efficient when applied as space-time data structures in a MIMO communications system. However, both structures $S_A$, $S_{T4}$ can be modified and then applied as efficient space-time data structures, in accordance with the present invention. Since the structures $S_A$, $S_{T4}$ will include symbols with complex values when they are applied as space-time data structures, the resultant data structures will typically not be unitary transmission matrices. Therefore, the structures $S_A$, $S_{T4}$ can be modified, in accordance with the present invention, to form unitary transmission matrices and, thus, provide efficient space-time data structures. Methods, in accordance with the present invention, to transform these structures $S_A$, $S_{T4}$ and other structures into efficient space-time data structures will be described below.

The following space-time preamble structure $S_{T8}$ is based on another data structure by Tarokh, et al., and the structure $S_{T8}$ can be applied in eight-antenna MIMO communications systems, in accordance with present invention, when the constituent symbols have real number values:

$$S_{T8} = \begin{bmatrix} S_1 & S_2 & S_3 & S_4 & S_5 & S_6 & S_7 & S_8 \\ -S_2 & S_1 & S_4 & -S_3 & S_6 & -S_5 & -S_8 & S_7 \\ -S_3 & -S_4 & S_1 & S_2 & S_7 & S_8 & -S_5 & -S_6 \\ -S_4 & S_3 & -S_2 & S_1 & S_8 & -S_7 & S_6 & -S_5 \\ -S_5 & -S_6 & -S_7 & -S_8 & S_1 & S_2 & S_3 & S_4 \\ -S_6 & S_5 & -S_8 & S_7 & -S_2 & S_1 & -S_4 & S_3 \\ -S_7 & S_8 & S_5 & -S_6 & -S_3 & S_4 & S_1 & -S_2 \\ -S_8 & -S_7 & S_6 & S_5 & -S_4 & -S_3 & S_2 & S_1 \end{bmatrix} \quad \text{EQ. 10}$$

The foregoing space-time preamble structure $S_{T8}$ can be simplified, in accordance with the present invention, so that the same training symbol is transmitted from each of the eight antennas of the MIMO system, as shown by the following simplified space-time preamble structure $S_{T8S}$ $$S_{T8S} = \begin{bmatrix} S_1 & S_1 & S_1 & S_1 & S_1 & S_1 & S_1 & S_1 \\ -S_1 & S_1 & S_1 & -S_1 & S_1 & -S_1 & -S_1 & S_1 \\ -S_1 & -S_1 & S_1 & S_1 & S_1 & S_1 & -S_1 & -S_1 \\ -S_1 & S_1 & -S_1 & S_1 & S_1 & -S_1 & S_1 & -S_1 \\ -S_1 & -S_1 & -S_1 & -S_1 & S_1 & S_1 & S_1 & S_1 \\ -S_1 & S_1 & -S_1 & S_1 & -S_1 & S_1 & -S_1 & S_1 \\ -S_1 & S_1 & S_1 & -S_1 & -S_1 & S_1 & S_1 & -S_1 \\ -S_1 & -S_1 & S_1 & S_1 & -S_1 & -S_1 & S_1 & S_1 \end{bmatrix} \quad \text{EQ. 11}$$

The foregoing structures $S_{T8}$, $S_{T8S}$ (i.e., EQ. 10 and EQ. 11) are typically efficient when applied as space-time preamble structures, in accordance with the present invention. However, these structures $S_{T8}$, $S_{T8S}$ are typically not efficient when applied as space-time data structures in a MIMO communications system. The structure $S_{T8}$ preferably can be modified and then applied as efficient space-time data structures, in accordance with he present invention. Since the structure $S_{T8}$ will include symbols with complex values when it is applied as a space-time data structure, the resultant data structure will typically not be a unitary transmission matrix. Therefore, the structure $S_{T8}$ can be modified, in accordance with the present invention, to form a unitary transmission matrix and, thus, provide an efficient space-time data structure. Methods, in accordance with the present invention, to transform this structure $S_{T8}$ and other structures into efficient space-time data structures will be described below.

Orthogonal structures, such as those introduced by Tarokh, et al., typically only have applications to MIMO communications systems that employ two, four, or eight transmit antennas. As described above, some of the orthogonal structures can be applied, in accordance with the present invention, in two-antenna MIMO systems as space-time data structures, with complex symbols, that are unitary transmission matrices. However, the application of existing orthogonal structures using complex symbols (e.g., for space-time data structures) in MIMO systems having more than two transmit antennas typically results in a loss of the system diversity gain and/or system bandwidth. For example, the following orthogonal structure $S_{T3}$ was introduced by Tarokh, et al. for use as a data structure with complex symbols in a three-antenna MIMO system:

$$S_{T3} = \begin{bmatrix} S_1 & S_2 & \frac{S_3}{\sqrt{2}} \\ -S_2^* & S_1^* & \frac{S_3}{\sqrt{2}} \\ \frac{S_3^*}{\sqrt{2}} & \frac{S_3^*}{\sqrt{2}} & \frac{-S_1 - S_1^* + S_2 - S_2^*}{2} \\ \frac{S_3^*}{\sqrt{2}} & \frac{S_3^*}{\sqrt{2}} & \frac{S_2 + S_2^* + S_1 - S_1^*}{2} \end{bmatrix} \quad \text{EQ. 12}$$

When the foregoing structure $S_{T3}$ is applied in a three-antenna MIMO system, it does not provide the full diversity performance of the system, which is the capability to transmit three symbols over three symbol periods. Instead, the structure $S_{T3}$ only provides for the transmission of three symbols over four symbol periods, which is apparent since the structure has a four rows instead of three. This lack of full diversity may result in a loss of as much as 25% of system throughput. However, methods, in accordance with the present invention, will be discussed below to transform such inefficient structures into efficient space-time structures (for preambles or data) that provide full diversity performance in MIMO communications systems.

The foregoing space-time preamble structures, in accordance with the present invention, can be applied in a Q-antenna MIMO communications system, such as the system 6 depicted in FIG. 1, using any applicable technique. For example, the space-time preamble structure $S_{T4}$ may be stored in a pilot/training symbol inserter 32 of the transmitter 8 of a four-antenna MIMO communications system 6 and combined with one or more data symbols for transmission over a channel 19, as discussed above.

In general the transmission matrix for Q transmit antennas over Q symbol intervals can be represented by the following matrix $S_{Q^2}$:

$$S_{Q^2} = \begin{bmatrix} S_1 & S_2 & \cdots & S_Q \\ S_{Q+1} & S_{Q+2} & \cdots & S_{2Q} \\ \vdots & & & \vdots \\ S_{Q(Q-1)+1} & \cdots & \cdots & S_{Q^2} \end{bmatrix} \quad \text{EQ. 13}$$

This general transmission matrix $S_{Q^2}$ can be composed using $Q^2$ different symbols (or sequences in the case of OFDM modulation). However, in general, only Q sequences are used to form a structure. As discussed above, the transmission performance of Q symbols over Q symbol periods indicates full diversity performance of the MIMO system and also indicates the utilization of the full bandwidth of the system. Thus, such performance indicates the optimal use of the system resources.

In order to utilize the structure of the foregoing general transmission matrix $S_{Q^2}$ to construct efficient space-time sequence structures for preambles, pilots and data to be applied in MIMO communications systems, the matrix $S_{Q^2}$ is pre-processed and/or pre-conditioned in accordance with the present invention.

Figure 6:
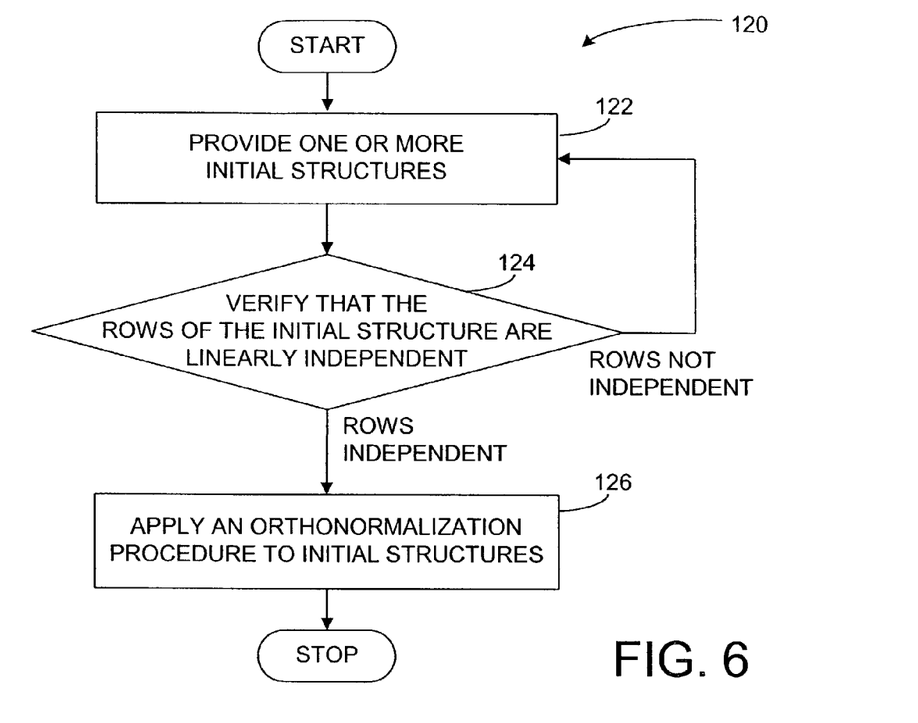
FIG. 6 is a flow chart illustrating a method for providing efficient space-time structures for preambles, pilots and data that may be implemented in the MIMO communications system depicted in FIG. 1.

FIG. 6 is a flow chart illustrating a method 120 for providing efficient space-time structures for preambles, pilots and data that may be implemented in a MIMO communications system, such as the system 6 depicted in FIG. 1. The method 120 begins with a step 122 in which one or more initial structures $S_{in}$ are provided for conversion into efficient space-time structures for preambles or data. The structure $S_{in}$ will typically have a form that is applicable to a Q×L MIMO communications system, where Q represents the number of transmit antennas and L represents the number of receive antennas, as discussed above. Thus, if the initial structure $S_{in}$ is to be applied to a MIMO system that has 4 transmit antennas (i.e., Q=4), the structure will typically have 4 columns and 4 rows, similar to the general transmission matrix $S_{Q^2}$ described above. Typically, the initial structure $S_{in}$ is formed of symbols from a known symbol alphabet. As discussed above, a symbol alphabet typically includes a finite set of values. In general, the initial structure $S_{in}$ may be any structure that has a possible application to a MIMO communications system with Q transmit antennas. One method, among others, to determine an initial structure $S_{in}$ will be discussed below with respect to FIG. 7.

Following step 122, the method 120 proceeds to step 124 in which the rows of the initial structure $S_{in}$ are verified to be linearly independent. The check for linear independence of the rows of the initial structure $S_{in}$ may be performed by various methods and techniques, which may be known in the art. For example, the rows of the initial structure $S_{in}$ can be tested for linear independence by determining the rank of the initial structure $S_{in}$. If the rank of the initial structure $S_{in}$ is determined to be Q, the rows of the initial structure $S_{in}$ are linearly independent. If the rows of the initial structure $S_{in}$ are determined to be linearly independent, the method 120 proceeds to the next step 126. However, if the rows of the initial structure $S_{in}$ are determined not to be linearly independent, the method 120 returns to step 122, in which one or more different initial structures $S_{in}$ are provided and the method 120 proceeds again to step 124.

In the step 126, an orthonormalization (i.e., orthogonalization and normalization) procedure is applied to the initial structure $S_{in}$. The orthonormalization procedure may be any procedure that transforms the initial structure $S_{in}$ to a space-time structure $S_{out}$ that has the properties of a unitary signal transmission matrix. As discussed above, a unitary transmission matrix has the following mathematical properties:

$$\sum_{j=1}^{Q} S_{i,j} S_{i',j}^* = \begin{cases} 1 & i = i' \\ 0 & i \neq i' \end{cases} \quad \text{EQ. 2A}$$

$$\sum_{i=1}^{Q} S_{i,j} S_{i,j'}^* = \begin{cases} 1 & j = j' \\ 0 & j \neq j' \end{cases} \quad \text{EQ. 2B}$$

where $S_{i,j}$ represents the constituent symbols of the unitary transmission matrix. One example of an orthonormalization procedure that may be applied to the initial structure $S_{in}$ to obtain a space-time structure $S_{out}$ that is a unitary signal transmission matrix is known as a row-wise Gram-Schmidt procedure. An example application of a row-wise Gram-Schmidt procedure will be presented below.

The resultant space-time structure $S_{out}$ that is obtained by the step 126 may be applied as an efficient space-time preamble structure or an efficient space-time data structure, depending on the characteristics of the constituent symbols of the structure. For example, as discussed above, an efficient space-time preamble structure includes symbols that provide time and frequency synchronization and estimation of noise variance and channel parameters. In contrast, an efficient space-time data structure typically includes symbols that have complex values, as also discussed above. Further, if OFDM modulation is employed in the communications system, the constituent symbols will be symbol sequences, as also discussed above.

The resultant space-time structure $S_{out}$ may be applied accordingly as a space-time preamble or data structure in a Q-antenna MIMO communications system, such as the system 6 depicted in FIG. 1, using any applicable technique, which may be known in the art. For example, a resultant space-time preamble structure $S_{out}$ may be stored in a pilot/training symbol inserter 32 of MIMO communications system transmitter 8 and combined with one or more data symbols for transmission over a channel 19, as discussed above.

Figure 7:
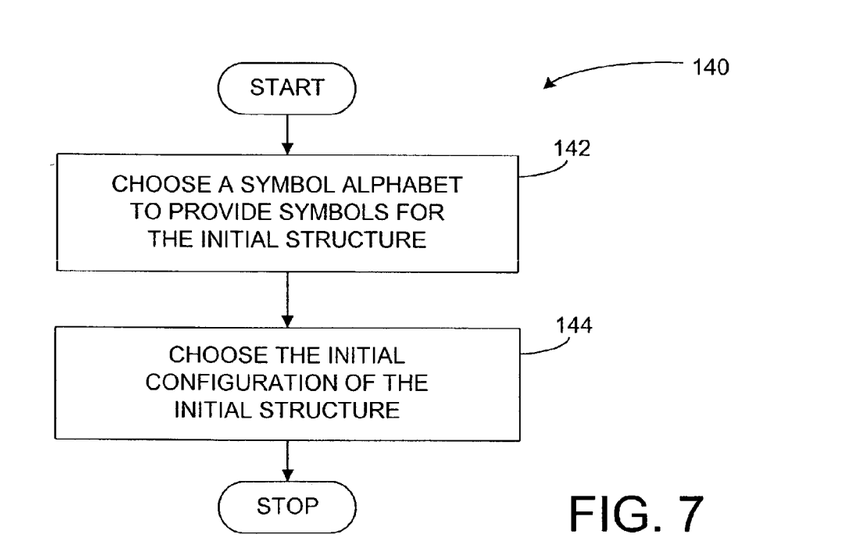
FIG. 7 is a flow chart illustrating an exemplary method to determine an initial structure for use in the method described with respect to FIG. 6.

FIG. 7 is a flow chart illustrating an exemplary method 140, among others, to determine an initial structure $S_{in}$ for use in the step 122 described above for FIG. 6. The exemplary method 140 begins with a step 142 in which a symbol alphabet is chosen to provide the symbols for the initial structure $S_{in}$. Preferably, the symbols (or symbol sequences in the case of OFDM modulation) are derived from a complex alphabet on the unit circle, that is, all of the alphabet points have the same energy. The following are exemplary alphabets in this regard:

Binary Phase Shift Keying (BPSK) alphabet: +1, −1

Quadrature Phase Shift Keying (QPSK) alphabet: 1+j, −1+j, −1−j, 1−j

8-Phase Shift Keying (8-PSK) alphabet: $\exp(j*2\pi i/8)$, i=0, 1, 2, . . . , 7

16-Phase Shift Keying (16-PSK) alphabet: $\exp(j*2\pi i/16)$, i=0, 1, 2, . . . , 15

32-Phase Shift Keying (32-PSK) alphabet: $\exp(j*2\pi i/32)$, i=0, 1, 2, . . . , 31

In general, M-Phase Shift Keying (M-PSK) alphabet: $\exp(j*2\pi i/M)$, i=0, 1, 2, . . . , M−1; M=8, 16, 32, . . .

The symbols or symbols sequences may also be derived from polyphase sequences, such as Chirp sequences; Milewski sequences; Frank-Zadoff sequences; Chu sequences; Suehiro polyphase sequences; and Ng et al. sequences, among others known in the art.

Following the step 142, the method 140 concludes with a step 144 in which the initial configuration of the initial structure $S_{in}$ is chosen. The determination of the initial configuration may add certain specific characteristics to the structure. For example, the initial configuration typically reduces the number of possible symbol combinations from $Q^2$ to Q. The initial configuration may be chosen from any structure configuration. The following are several examples of a possible initial configuration of the initial structure $S_{in}$:

Circular configuration, $S_C$:

$$S_C = \begin{bmatrix} S_1 & S_2 & \cdots & S_Q \\ S_Q & S_1 & \cdots & S_{Q-1} \\ \vdots & & & \vdots \\ S_2 & \cdots & \cdots & S_1 \end{bmatrix} \quad \text{EQ. 14}$$

Symmetric configuration, $S_S$:

$$S_S = \begin{bmatrix} S_1 & S_2 & \cdots & S_Q \\ S_2 & S_1 & \cdots & S_{Q-1} \\ \vdots & & & \vdots \\ S_Q & \cdots & \cdots & S_1 \end{bmatrix} \quad \text{EQ. 15}$$

Based on the determination of the symbol alphabet and the initial structure configuration in the step 142 and the step 144, respectively, an initial structure $S_{in}$ can be determined. This initial structure $S_{in}$ can be used in the method 120, depicted in FIG. 6, to obtain an efficient space-time structure, as discussed above.

Figure 8:
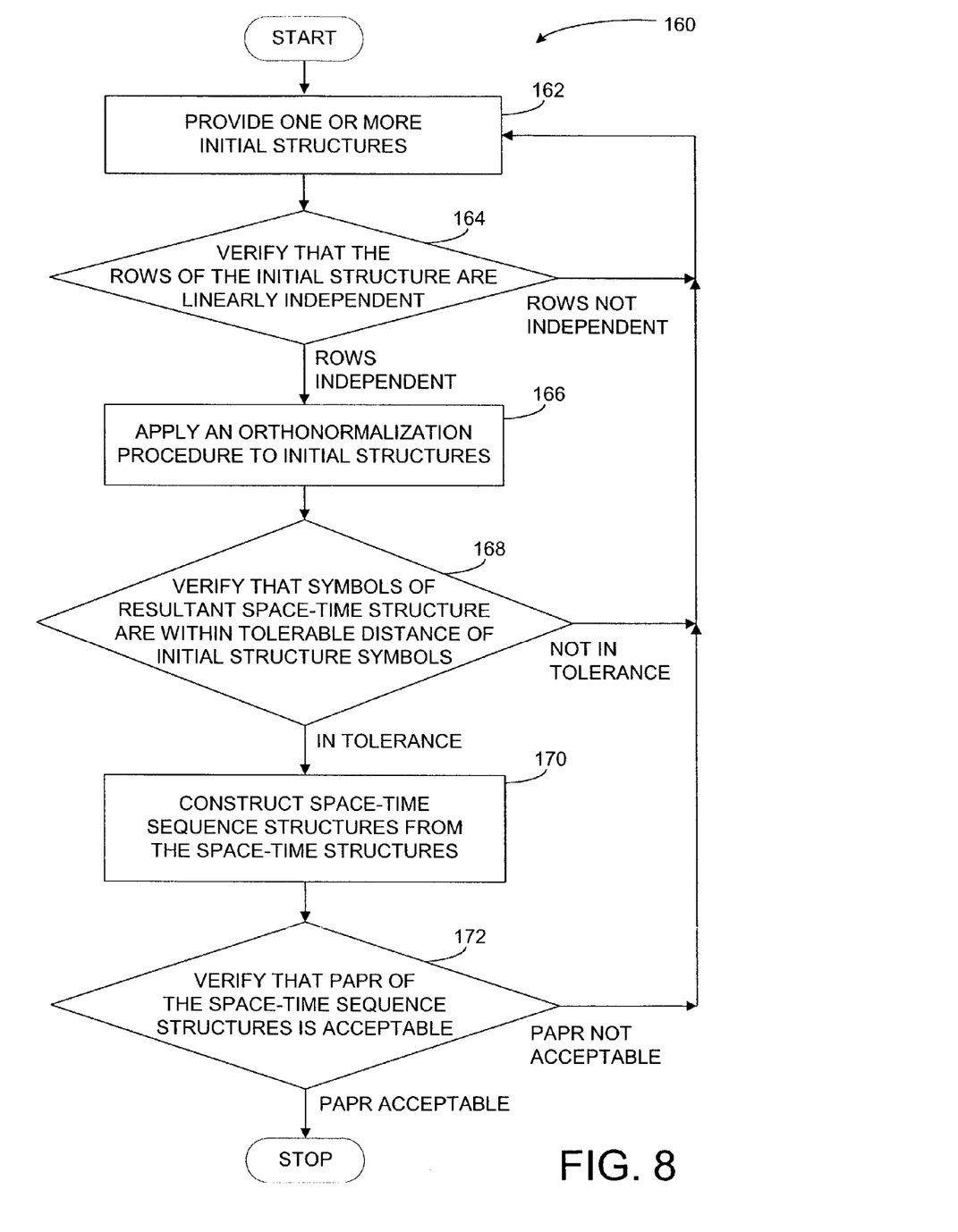
FIG. 8 is a flow chart illustrating an alternative method for providing efficient space-time structures for preambles, pilots and data that may be implemented in a MIMO communications system, such as the system depicted in FIG. 1.

FIG. 8 is a flow chart illustrating an alternative method 160 for providing efficient space-time structures for preambles, pilots and data that may be implemented in a MIMO communications system, such as the system 6 depicted in FIG. 1. The method 160 begins with a step 162 in which one or more initial structures $S_{in}$ are provided for conversion into efficient space-time structures for preambles or data. The step 162 is at least substantially similar to the step 122 discussed above with respect to FIG. 6. Following the step 162, the method 160 proceeds to a step 164 in which the rows of the initial structure $S_{in}$ are verified to be linearly independent. This step 164 is at least substantially similar to the step 124 discussed above with respect to FIG. 6.

If the rows of the initial structure $S_{in}$ are determined to be linearly independent, the method 160 proceeds from the step 164 to a step 166 in which an orthonormalization procedure is applied to the initial structure $S_{in}$ to transform the initial structure $S_{in}$ to a space-time structure $S_{out}$ that has the properties of a unitary signal transmission matrix. This step 166 is at least substantially similar to the step 126 discussed above with respect to FIG. 6. However, if the rows of the initial structure $S_{in}$ are determined not to be linearly independent, the method 160 returns to step 162.

Following the step 166, the method 160 proceeds to a step 168 in which the alphabet points of the constituent symbols of the resultant space-time structure $S_{out}$ are checked to be within a tolerable distance of the alphabet points of the constituent symbols of the initial structure $S_{in}$. The amplitude of the alphabet points may be modified during the orthonormalization procedure in the step 166. The tolerable distance is typically dependent on the operating capability of components of the MIMO communications system 6, such as digital-to-analog (D/A) converters. The constituent symbols of the space-time structure $S_{out}$ may be checked to be within a tolerable distance of the original alphabet points by various methods and techniques, which are known in the art. For example, the constituent symbols of the space-time structure $S_{out}$ may be checked to be within a tolerable distance by application of a Euclidean distance metric represented, for example, by the following equation:

$$d_{t,l} = \|S_t - S_l\|^2 \quad \text{EQ. 16}$$

If the constituent symbols of the space-time structure $S_{out}$ are found to be within a tolerable distance from the original alphabet points of the initial structure $S_{in}$, the space-time structure $S_{out}$ is stored in a memory or other device for application in a MIMO communications system. However, if the constituent symbols of the space-time structure $S_{out}$ are not determined to be within a tolerable distance from the original alphabet points, the method 160 returns to step 162, in which one or more different initial structures $S_{in}$ are provided and the method 160 proceeds again as described above.

In the case of a MIMO communications system that employs OFDM modulation, the steps 162 through 168 may be repeated until a sufficient number of space-time structures $S_{out}$ that are unitary signal transmission matrices are obtained and stored, as discussed above.

If the symbols are within a tolerable distance, in step 170, the stored space-time structure $S_{out}$ used to construct space-time sequence structures $S_{out,k}$, where k represents a sub-carrier or sub-channel index of the OFDM setup. The space-time sequence structures $S_{out,k}$ may be constructed by an encoder, as described above with respect to FIGS. 2 and 5, or other methods, which may be known in the art, may be utilized to construct the space-time sequence structures $S_{out,k}$.

In the final step 172 of the method 160, the peak-to-average power ratio (PAPR) of the space-time sequence structures $S_{out,k}$ are tested to determine if the PAPR of the structures is low enough to provide efficient signal transmission and reception in a MIMO OFDM communications system. The PAPR of the training sequences may be tested by various methods and techniques, which may be known in the art. For example, the PAPR of the space-time sequence structures $S_{out,k}$ may be tested by converting the structures to the time domain (e.g., by inverse Fourier transform or "IFT") and calculating the PAPR of the resultant signal samples. If the PAPR of the space-time sequence structures $S_{out,k}$ is found to be acceptable (e.g., at or approaching unity), the structures have been determined to be efficient, in accordance with the present invention, and may be used for preambles or data in a MIMO communications system 6 employing OFDM modulation. However, if the PAPR of the space-time sequence structures $S_{out,k}$ are found to be unacceptably high, the method 160 returns to step 162, in which one or more different initial structures $S_{in}$ are provided and the method 160 proceeds again as described above.

In the case of some orthogonal polyphase sequences, complex coefficients $b_i$ that are used to modulate the sequences may be useful to form efficient space-time sequence structures $S_{out,k}$. In this regard, modulation of the orthogonal polyphase sequences by the complex coefficients $b_i$ may make the rows of the corresponding space-time structures $S_{out}$ linearly independent. Furthermore, the modulation by the complex coefficients $b_i$ may also reduce the PAPR of the resulting space-time sequence structures $S_{out,k}$ that are formed from the space-time structures $S_{out}$.

In the step 126 of the method 120 and the step 166 of the method 160, described above with respect to FIGS. 6 and 8, respectively, an orthonormalization procedure is applied to the initial structure $S_{in}$ to transform the initial structure $S_{in}$ to a space-time structure $S_{out}$ that has the properties of a unitary signal transmission matrix. As discussed above, one example of such an orthonormalization procedure is a row-wise Gram-Schmidt procedure. In general, when a matrix $S_k$ is subjected to the Gram-Schmidt procedure, the resulting matrix $S'_k$ will be unitary, so long as the rank of $S_k$ is Q or the rows of $S_k$ are linearly independent. In a row-wise application of the Gram-Schmidt procedure to a matrix $S_k$, the first row of the matrix $S_k$ is unchanged and used as a reference to make the remaining rows orthonormal (i.e., orthogonal and normal). The following matrices illustrate the application of a row-wise Gram-Schmidt procedure to a 4×4 matrix $S_k$ to obtain the orthogonalized unitary matrix $S'_k$:

$$S_k = \begin{bmatrix} .5e^{-.03j} & .5e^{.00j} & .5e^{.00j} & .5e^{.07j} \\ .5e^{-.89j} & .5e^{-.49j} & .5e^{.17j} & .5e^{-.32j} \\ .5e^{-.69j} & .5e^{-.80j} & .5e^{.20j} & .5e^{-.28j} \\ .5e^{-1.3j} & .5e^{-.72j} & .5e^{-.70j} & .5e^{-.74j} \end{bmatrix} \quad \text{EQ. 17}$$

$$S'_k = \begin{bmatrix} .5e^{-.03j} & .5e^{.00j} & .5e^{.00j} & .5e^{.07j} \\ .62e^{-2.0j} & .16e^{-1.4j} & .76e^{1.3j} & .1e^{-.2j} \\ .47e^{-.75j} & .83e^{-2.2j} & .24e^{1.3j} & .14e^{-1.0j} \\ .37e^{-2.6j} & .17e^{-2.4j} & .34e^{-.70j} & .85e^{-.88j} \end{bmatrix} \quad \text{EQ. 18}$$

It is noted that embodiments of the present invention, such as those described above, may be implemented in hardware, software, firmware, or a combination thereof. For example, in some embodiments, the present invention may be implemented as a computer program or application in software or firmware that is stored in a memory and that is executed by a suitable instruction execution system. In other embodiments the present invention may be implemented, for example, with one or a combination of the following technologies, which may be known in the art: one or more discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is further noted that any process descriptions or blocks in flow charts described above may represent modules, segments, and/or portions of a computer program or application code that includes one or more executable instructions for implementing specific logical functions or steps in the process. Alternate implementations are included within the scope of the present invention in which functions may be executed out of order from that shown in the figures and/or discussed above, including substantially concurrently or in reverse order, depending at least in part on the functionality involved, as will be understood by those skilled in the art.

With regard to any block diagrams described above, although the flow of data or other elements may be depicted as unidirectional or bi-directional, such depictions are merely exemplary and not limiting. Variations of the flows depicted in the block diagrams are included within the scope of the present invention. Furthermore, the functionality of some of the blocks may be implemented by a single combined block within the scope of the present invention.

Moreover, embodiments of the present invention, such as those described above, may comprise an ordered listing of executable instructions for implementing logical functions which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" may be any means that can contain, store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, device, or propagation medium. More specific examples (i.e., a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). It is noted that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Finally, it should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the invention, and protected by the following claims.

We claim:

1. A computer program embodied in a computer readable medium for providing efficient space-time structures for preambles, pilots and data for multi-input, multi-output communications systems, the computer program comprising:

logic configured to provide an initial structure;

logic configured to verify that rows of said initial structure are linearly independent;

logic configured to apply an orthonormalization procedure to said initial structure to obtain a space-time structure for a preamble or pilot in a time or frequency domain; and logic configured to insert the space-time structure as a preamble or pilot in the time or frequency domain with one or more data symbols for transmission in the multi-input, multi-output communications system.

2. The computer program of claim 1, wherein said logic configured to provide an initial structure comprises:

logic configured to choose a symbol alphabet to provide symbols for said initial structure; and logic configured to choose an initial configuration of said initial structure.

3. The computer program of claim 1, further comprising:

logic configured to confirm that symbols of said space-time structure are within a predetermined distance of symbols of said initial structure;

logic configured to construct a space-time sequence structure from a plurality of said space-time structures; and logic configured to verify that a peak-to-average power ratio of said space-time structure is less than a predetermined value.

4. The computer program of claim 3, wherein said logic configured to confirm chat the symbols of said space-time structure are within a predetermined distance of the symbols of said initial structure comprises logic configured to apply a Euclidean distance metric to determine the distance between the symbols of said space-time structure and the symbols of said initial structure.

5. The computer program of claim 1, wherein said logic configured to verify that the rows of said initial structure are linearly independent comprises logic configured to determine rank of said initial structure.

6. The computer program of claim 1, wherein said logic configured to apply an orthonormalization procedure to said initial structure to obtain a space-time structure comprises logic configured to apply a row-wise Gram-Schmidt procedure to said initial structure to obtain a space-time structure.

* * * * *